United States Patent [19]

Muehlberger et al.

[11] Patent Number: 5,696,908
[45] Date of Patent: Dec. 9, 1997

[54] TELEPHONE DEBIT CARD DISPENSER AND METHOD

[75] Inventors: Karl Muehlberger; Richard Sinek, both of Lakeland; Michael Hughes, St. Petersburg Beach, all of Fla.

[73] Assignee: Southeast Phonecard, Inc., Lakeland, Fla.

[21] Appl. No.: 479,705

[22] Filed: Jun. 7, 1995

[51] Int. Cl.⁶ .............. G06F 17/60; G06G 7/52; H04M 11/00; G06K 5/00

[52] U.S. Cl. .............. 395/239; 395/241; 235/380; 379/91; 379/114; 379/144

[58] Field of Search ............... 379/91, 112, 114, 379/115, 119, 121, 143, 144; 235/375, 380, 381; 221/197, 268; 364/401, 408, 464.01, 479; 395/239, 241, 242, 243

[56] References Cited

U.S. PATENT DOCUMENTS

| | | |
|---|---|---|
| 4,247,759 | 1/1981 | Yuris et al. . |
| 4,528,643 | 7/1985 | Freenu, Jr. . |
| 4,577,061 | 3/1986 | Katzeff et al. . |
| 4,677,565 | 6/1987 | Ogaki et al. . |
| 4,879,744 | 11/1989 | Tasaki et al. . |
| 4,884,212 | 11/1989 | Stutsman . |
| 4,951,308 | 8/1990 | Bishop et al. . |
| 5,068,891 | 11/1991 | Marshall . |
| 5,138,650 | 8/1992 | Stahl et al. ............ 379/114 |
| 5,146,067 | 9/1992 | Sloan et al. ............ 235/381 |
| 5,163,086 | 11/1992 | Ahearn et al. . |
| 5,220,593 | 6/1993 | Zicker et al. . |
| 5,265,155 | 11/1993 | Castro . |
| 5,272,320 | 12/1993 | Hakamada .............. 235/380 |
| 5,285,382 | 2/1994 | Muehlberger et al. . |
| 5,340,969 | 8/1994 | Cox . |
| 5,352,876 | 10/1994 | Watanabe et al. . |
| 5,359,182 | 10/1994 | Schilling . |
| 5,409,092 | 4/1995 | Itako et al. ............ 235/381 |
| 5,442,567 | 8/1995 | Small .................... 364/479 |
| 5,504,808 | 4/1996 | Hamrick, Jr. ........... 379/114 |
| 5,511,114 | 4/1996 | Stimson et al. ......... 379/114 |
| 5,513,117 | 4/1996 | Small .................... 364/479 |

FOREIGN PATENT DOCUMENTS

| | | |
|---|---|---|
| 0397512 | 5/1990 | European Pat. Off. . |
| 2238593 | 9/1990 | Japan . |
| 2278495 | 11/1990 | Japan . |
| 3100791 | 4/1991 | Japan . |

*Primary Examiner*—Curtis Kuntz
*Assistant Examiner*—Paul Loomis
*Attorney, Agent, or Firm*—Allen, Dyer, Doppelt, Milbrath & Gilchrist, P.A.

[57] ABSTRACT

Telephone debit cards are automatically vended through a microprocessor controlled vending machine which permits card payment in cash and credit. The customer can select a desired telephone card value and a desired telecommunications carrier. Prepaid and printed cards are dispensed. Optionally, printed receipts are dispensed including an access code and prepaid value. The vending machine generated real-time communications with an electronics funds clearing house for customer validity and funds approval. After electronics transfer of funds to the machine, the telephone debit card is dispensed and funds are electronically transferred to the selected telecommunications carrier via real-time communications with the carrier for electronic transfer of the card value thus permitting immediate use of the telephone card by the customer.

27 Claims, 6 Drawing Sheets

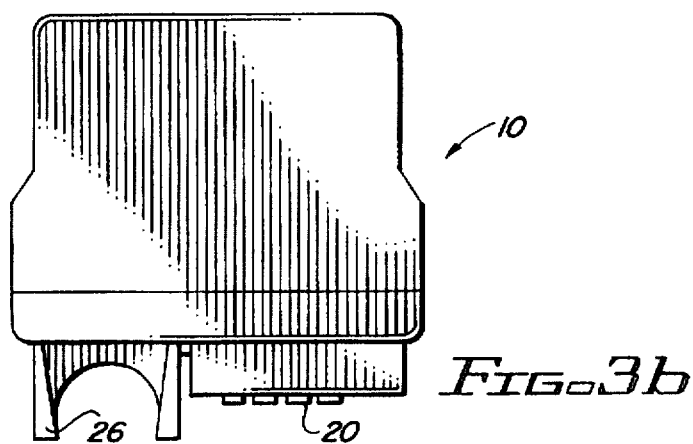
FIG. 3b
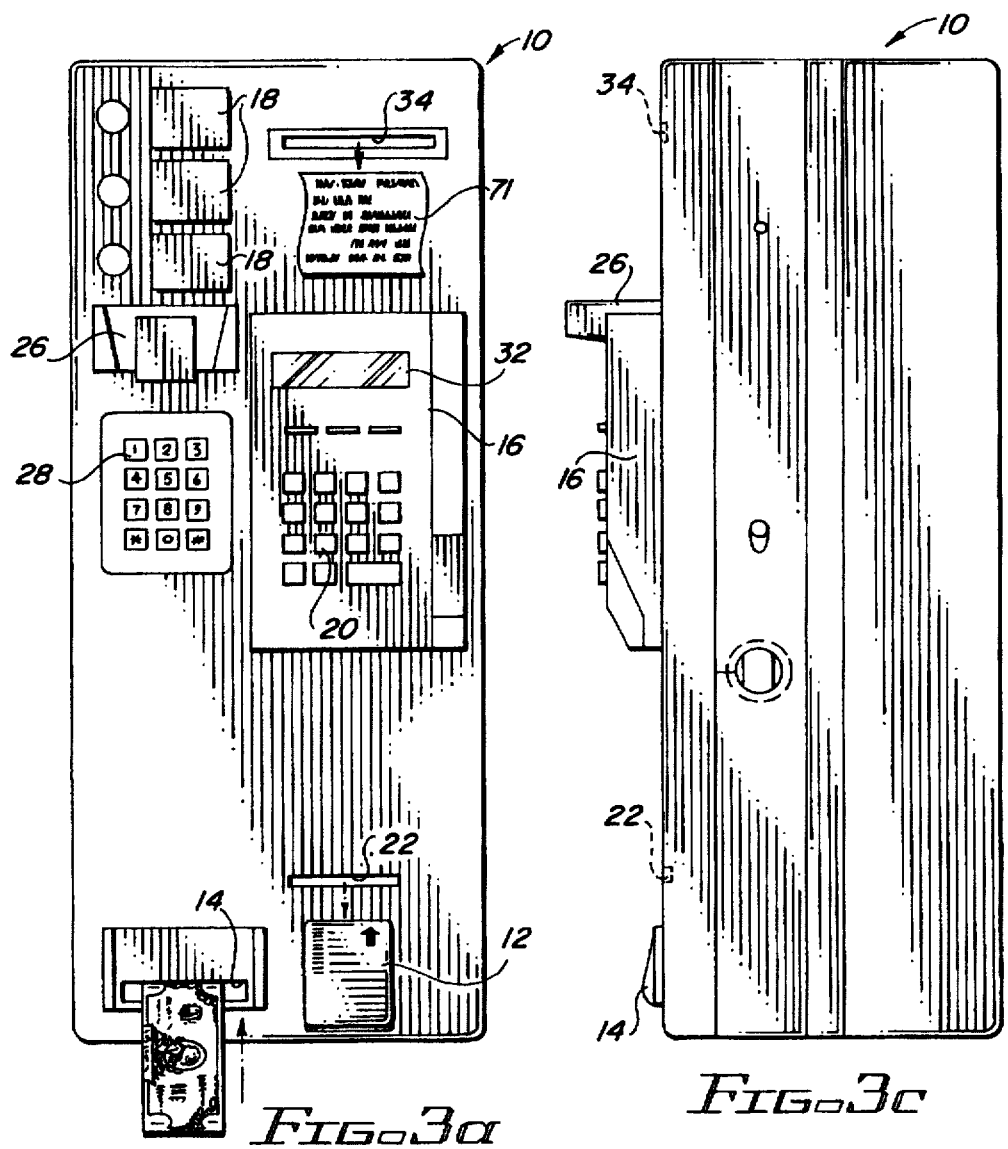
FIG. 3a
FIG. 3c

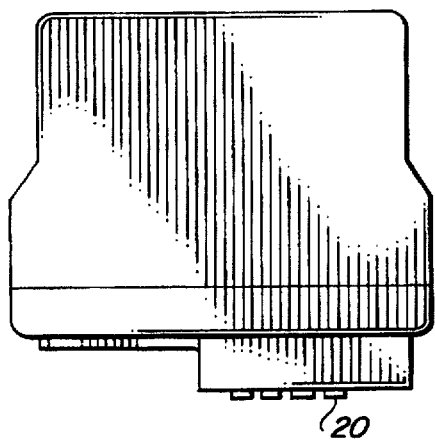
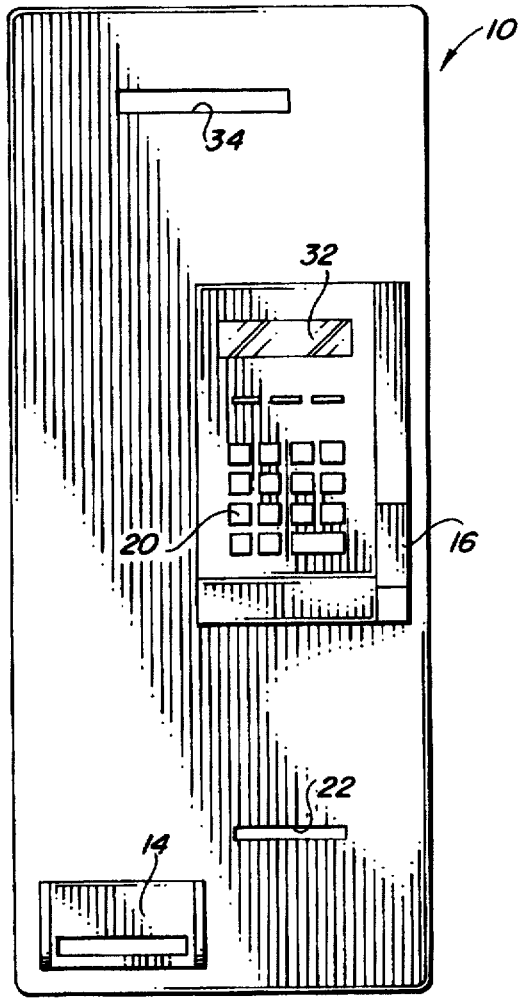
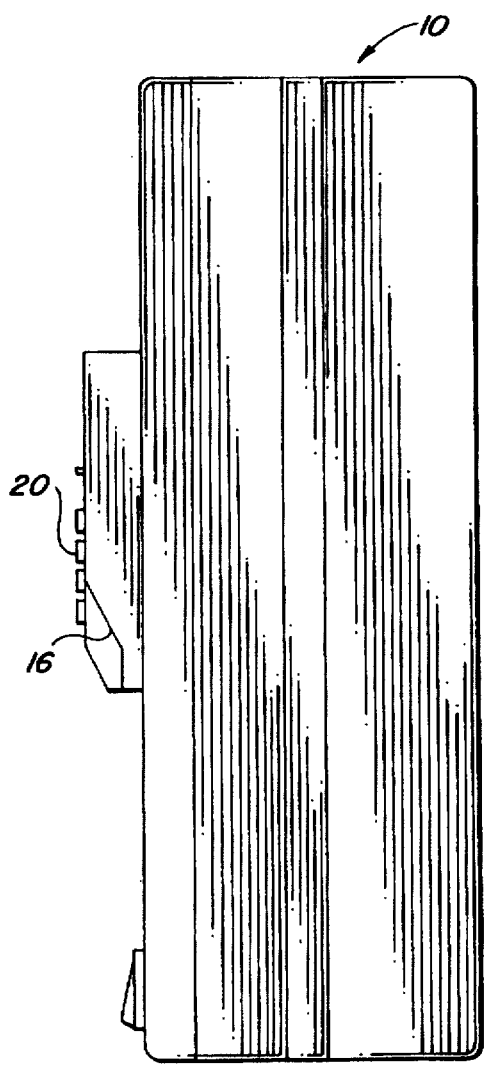

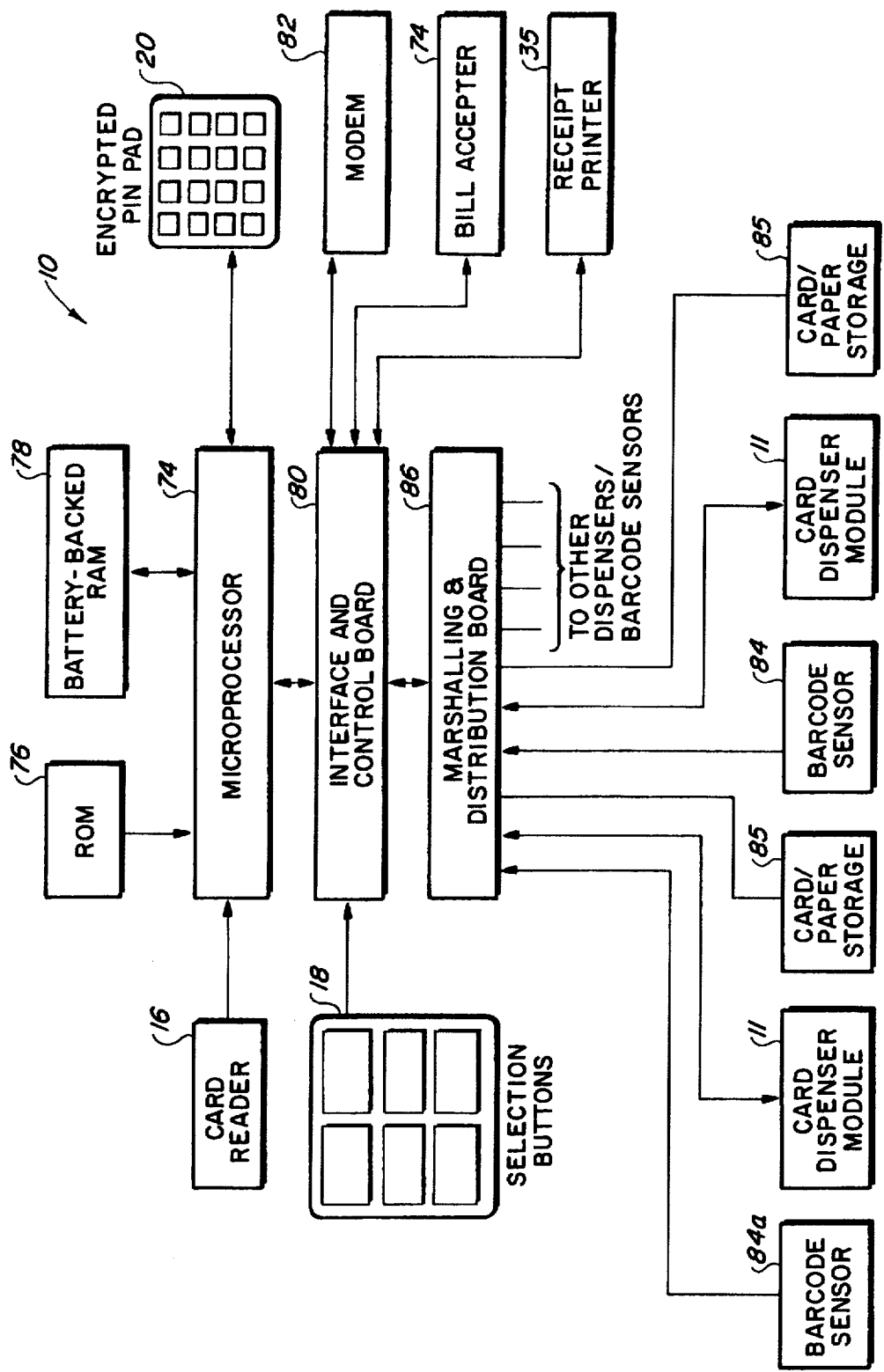

TELEPHONE DEBIT CARD DISPENSER AND METHOD

BACKGROUND OF INVENTION

1. Field of Invention

The present invention relates generally to the vending of debit cards, and more particularly to the automatic dispensing of telephone debit cards after payment by cash, credit card or bank card.

2. Background Art

The success of prepaid telephone cards is well documented. Since their introduction in the '80's, approximately 26 billion telephone cards have been sold throughout the world. In addition to their use as a debit card in placing telephone calls, they have had extensive use in the marketing areas of promotion and advertising. Companies have offered telephone cards in conjunction with their target advertising and for use in promotion of their products. However, in the United States, the prepaid telephone card business is yet in its infancy. According to a Gallup survey for American Banker in the Fall of 1994, only two percent of consumers had used prepaid telephone cards. Thirty-seven percent said they were aware of the telephone card. Both the Gallup survey and a 1993 survey by Electronik Payment Services, found that twenty-one percent of consumers were interested in prepaid telephone cards. Further the Gallup survey found that the demographic segment most open to the idea of using a telephone card included the ages of 18 through 34. Clearly, the prepaid telephone card business is finding itself in a major emerging market.

Current distribution of telephone cards has typically been through "over the counter" sales at grocery stores, convenience stores, gas stations, and to a lesser extent through manually operated mechanical vending machines. The advantages of vending machine distribution, as opposed to over the counter sales, are so extensive that the demand for even manual, simple machines has outstripped supply as of this writing. Retail stores, especially convenience stores welcome a vending solution that addresses their concerns about having to carry expensive card inventory, theft, accounting and the labor costs associated with each. A vending machine that can automatically dispense telephone cards eliminates the majority of these concerns and is needed for the advancement of telephone card distribution and use.

At present, the telephone card can be used to place local, long distance and international calls. Typically, telephone cards are issued in present values of $5.00, $10.00 and $20.00 denominations. To attract the interest of the consumer, special collector card packs have been designed to make the card more attractive. Typically, a face of each card contains a special coding information including the month and year the card was manufactured. A code can represent the type of card and includes the issue quantity or card value. In many cases, issued telephone cards will only work with specially equipped charge card telephones. Many remote memory 800 number based cards have been produced that require such special equipment. The use of such special equipment has been justified because of the convenience offered to the consumer in having to dial fewer digits when placing a call.

The implication is that telephone cards will increasingly replace coin operated telephones. The major telecommunication carriers would introduce coinless public telephones for one obvious reason: the carrier will have the use of a customer's cash before the customer consumes the card's full value. Further, as discussed, the attraction of providing "mini-billboards" for advertising campaigns is another valuable attraction. Target markets for the telephone card have included the largely transient market of college students, military personnel and foreign tourists typically charging their premium rates for domestic calls. Automatically vending the telephone card will reduce the overhead costs associated with the retail distribution of the cards and can dramatically reduce the cost of a telephone call to the consumer using such a card.

Automated machines for handling credit and debit transactions, including vending machines and automatic teller machines have already proven to be successful in the marketplace. Electronically operated vending machines have been used to return a product when a customer presents a credit card or similar coded token.

U.S. Pat. No. 5,285,382 to Muehlberger et al. discloses a system and method for processing credit card transactions, which includes a data processor with memory storage capable of accessing an electronic clearing facility through a time-rated, for example, long distance, communication link. The system generates a real-time communication with the clearing facility to determine card validity and to initiate funds collection for transactions above a predetermined amount. Muehlburger '382 discloses a system which is particularly useful for remote automated vending machines and automatic teller machines which typically handle a large volume of credit and debit transactions, each of which represents a small dollar amount.

U.S. Pat. No. 4,951,308 to Bishop et al discloses the automated vending of cellular hand-held telephones and cellular telephone services. The cellular telephone services are automatically vended through a microprocessor controlled vending machine which inventories a plurality of mobile cellular telephones and selectively delivers one of the phones after reading a customer credit card number and obtaining credit card approval. The mobile cellular telephone is dispensed and later returned by the customer. An electro-mechanical storage mechanism is provided for holding a plurality of telephone units. A dispensing circuit selectively dispenses one of the mobile telephone units from the storage mechanism.

The success of automatic vending machines in general certainly supports the thought that an automatic vending machine for dispensing telephone cards will enhance its market use and provide benefit to the consumer. As discussed, the current distribution of telephone cards has primarily been through over the counter sales and through simple mechanical vending machines. There is a need for an automatic telephone card vending machine that will accept payment for the card in any form. In other words, credit card, ATM card or cash, as opposed to cash only must be incorporated in such vending to satisfy such a need. In addition, there is a need to have on-line monitoring capability for management reports, inventory, and system diagnostics. Further, there is a need to provide a telephone card having a desired value, not only fixed values, and to validate the card for that value as it is dispensed, thus eliminating expensive telephone card inventories.

Telephone companies have been able to sell telephone time at premium rates when using the telephone card, thus further placing a demand on the need for dispensing the telephone card. Further advertising and promotions provide value when placed on the cards providing yet another source for funds from the advertiser. The customer has the convenience of not needing cash to place a telephone call. The telephone company has the use of the consumer's money before it is expensed. Further, the maintenance associated with coin telephones is eliminated. There is a need to provide for the automatic dispensing of the telephone card. Further, an automatic vending machine requiring low card inventory, one that eliminates the need for dispensing of prepaid cards thus avoiding theft, one that provides accounting, and avoids the labor costs associated with present methods of selling cards is needed.

SUMMARY OF INVENTION

It is an object of the present invention to provide a turn key vending apparatus and method for the automatic dispensing of telephone debit cards. It is further an object to provide such an apparatus that accepts multiple forms of payment including cash, credit card, or ATM card. Further, it is an object of the invention to provide an apparatus that has on line monitoring capability and can generate real-time communications with a clearing house and multiple telecommunications carriers to validate credit transactions for the appropriate card value. Further, it is an object to initiate electronic funds transfer to the selected telecommunications carrier for permitting immediate use of the telephone card when received by the consumer. It is yet another object of the invention to eliminate the need for expensive telephone card inventory.

The present invention provides an apparatus and method of dispensing a card for use in prepaid or debit purchasing from various vendors and includes the storing of a plurality of cards for providing an activation code acceptable to the vendor. Each code has a distinguishable value for permitting telephone time credit purchasing. A value is selected in response to a customer's demand. The customer demand is associated with a payment sufficient for dispensing the card having the selected value. The card is provided with a distinguishable activation code for the selected vendor which includes the selected value. The activation code is reported to the vendor for permitting card use by the customer as the card is dispensed to the customer. The value of the dispensed card is then reported to the lender or a clearing house representing the lender.

In a preferred embodiment of the invention, a prepaid telephone card for use in placing local and long distance calls is dispensed from a system having data processing and telecommunications means for communicating with multiple telecommunications carriers or switch and an electronic clearing house for initiating funds collection from the house and payment to a selected telecommunications carrier for each phone card transaction. A card value is selected by the customer for providing an activation code acceptable to the selected telecommunications carrier wherein each code permits prepaid purchasing from that carrier. The value selected is in response to a customer demand associated with an electronic funds transfer payment having the selected value. Customer identification sufficient for obtaining customer credit approval from an associated lender through the clearing house is received from the customer. A real-time communication is generated to the clearing house for determining validity and for initiating electronic funds collection. Customer identification validity is requested. Further, electronic funds transfer is initiated in the amount of the selected value. The card is then provided having the value and an activation code recognizable by the selected carrier. A real-time communication is then generated to the selected carrier for initiating electronic funds payment to the carrier along with the activation code for permitting phone card use by the customer immediately after the card is dispensed.

BRIEF DESCRIPTION OF DRAWINGS

A preferred embodiment of the invention as well as alternate embodiments are described by way of example with reference to the accompanying drawings in which:

FIGS. 3a–3c are front elevation, top plan, and side elevation views of an alternate embodiment of a phone card dispenser of the present invention;

FIGS. 4a–4c are front elevation, top plan and side elevation views respectively for yet another embodiment of the phone card dispenser;

FIG. 7 is a functional flow chart illustrating hardware implementation of a preferred embodiment of the present invention.

DETAILED DESCRIPTION OF PREFERRED EMBODIMENT

Figure 1:
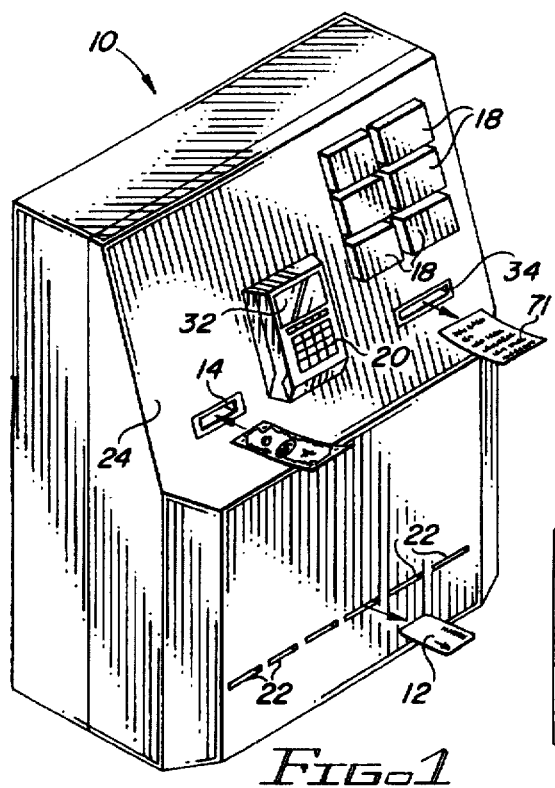
FIG. 1 is a front right perspective view of a phone card dispenser of the present invention.
Figure 2:
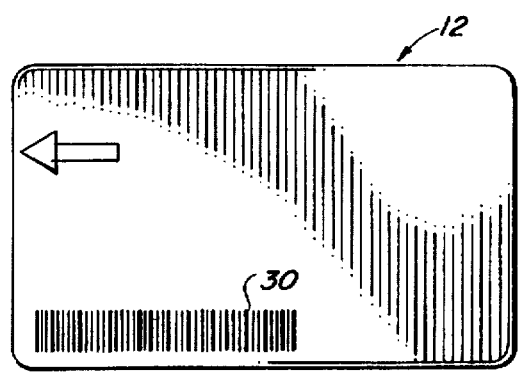
FIG. 2 is a view of a phone card face.
Figure 1B:
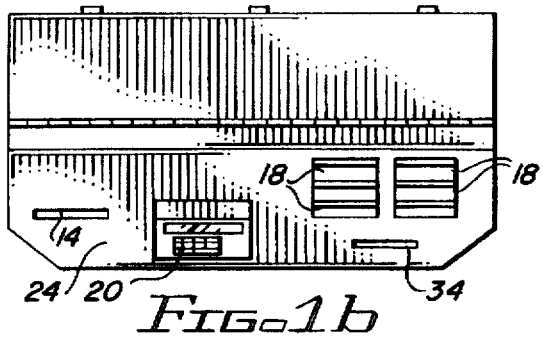
FIGS. 1a–1c are front elevation, top plan, and side elevation view of the dispenser of FIG. 1.
Figure 1A:
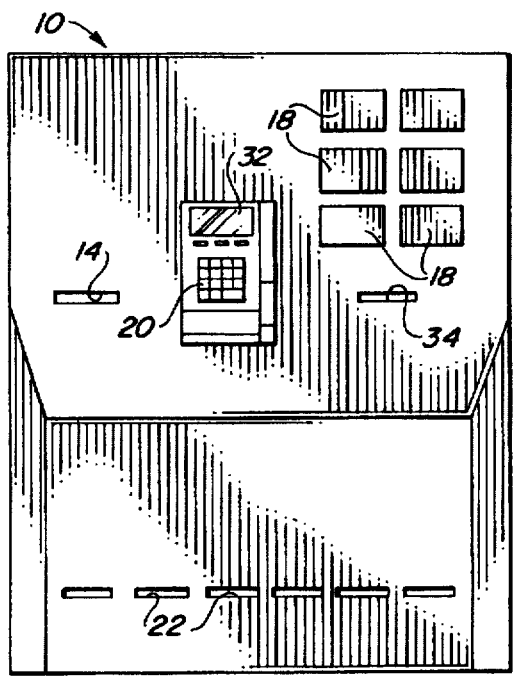
Figure 1C:
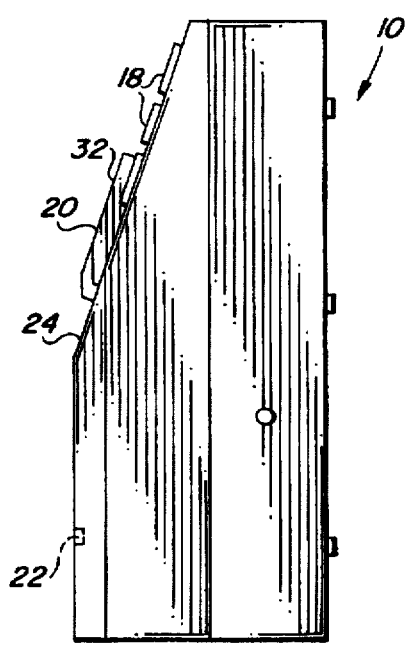

The preferred embodiment of the present invention includes a method of dispensing a telephone debit card for use in credit purchasing from a selected vendor wherein a phone card dispenser 10 as illustrated with reference to FIG. 1 is a selfcontained apparatus for dispensing a phone debit card 12 as illustrated, by way of example, with reference to FIG. 2. Again as illustrated with reference to FIG. 1, the phone card dispenser 10 comprises a bill receiver 14 for receiving cash payments and a credit card reader 16 for receiving payments using a credit card, ATM card or the like. For fixed value selections, value selection buttons 18 are provided. For data entry supporting a credit request, an input key pad 20 is provided. The phone card dispenser dispenses a phone card 12 through a phone card dispenser port 22 corresponding to the selected button 18 located on a face 24 of the phone card dispenser 10. The dispenser ports 22 are output from a dispenser module 11 later described with reference to system hardware functions of FIG. 7.

The phone card dispenser 10 has alternate embodiments as described with reference to FIGS. 2a–2c for the embodiment described in FIG. 1, as well as the embodiment illustrated with reference to FIGS. 3a–3c, incorporating a telephone handset hook 26 for a handset (not shown) and telephone key pad 28 for combining the functions of the phone card dispenser 10 with the typical functions of a public telephone. In yet another embodiment, illustrated with reference to FIGS. 4a–4c, the phone card dispenser 10 incorporates the public telephone image without the phone handset hook 26 or telephone key pad 28 illustrated with reference to FIGS. 3a–3c.

In the embodiment illustrated with reference to FIG. 1, a customer has up to six phone card value options for quick selection by depressing the value selection buttons 18 appropriate for his choice. A button 18 can include a fixed value for a selected carrier. Alternately, all buttons can be for a fixed carrier at various values. The combinations of value and carriers selected will be determined by the operator of the dispenser 10. It is expected that alternate options will be incorporated into alternate embodiments of the phone card dispenser 10. By way of example, in addition to dispensing the phone card 12, the phone card dispenser 10 will dispense a ticket-styled receipt having an access code number printed on the receipt. The access code number can be an alphanumeric number or a bar code display as illustrated with reference to the phone card 12 of FIG. 2. The bar code 30 provides the access code issued by the telephone switch or selected telecommunications carrier through the phone card dispenser 10. Such a code permits a customer to make telephone calls on an account in the same way as the phone card.

In operation, a customer selects an option of value and carrier by pressing one button from the selection buttons 18 and is then prompted to either insert the appropriate cash value through the bill receiver 14 or swipe a credit card or debit card through the credit card reader 16. If cash is entered, the dispenser 10 will dispense the phone card 12 as soon as the full amount is inserted in teh case of preprinted phone cards. If cash is inserted before a selection is made, the amount of cash counted is shown on the display 32 so that the customer can select the value of the phone card 12 after the cash is accepted by the dispenser t0. If a credit or debit card is used, the dispenser 10 will generate a real-time communication to a validation service to verify proper use of the credit card and request electronic transfer of the value of the selected phone card 12 from the customer's account to the dispenser operator's account. By way of example, the dispenser operator may be a convenience store operator or any retail distribution center. In the case of an ATM or debit card, the verification will involve the additional entry of a PIN code by the customer using the input key pad 20. The dispenser 10 prompts the customer using the display 32 if such is required. After entry by the customer, the dispenser 10 encodes and transmits the information to the validation service (a clearing house). If a credit card is read prior to making a phone card value selection, the dispenser 10 will prompt the customer to make a selection from one of the selection buttons 18 or enter any desired value for a desired phone card using the input key pad 20.

Alternately, and again as illustrated with reference to FIG. 1, a receipt 71 is printed having a value selected and an access number for the carrier selected. The issuing of a receipt 71 through a receipt printer port 34 can be made in place of card 12 issues. By way of example, card 12 inventory may have been depleted, only preprinted cards 12 are stored and receipts 71 used for arbitrary values desired by the customer.

Figure 5:
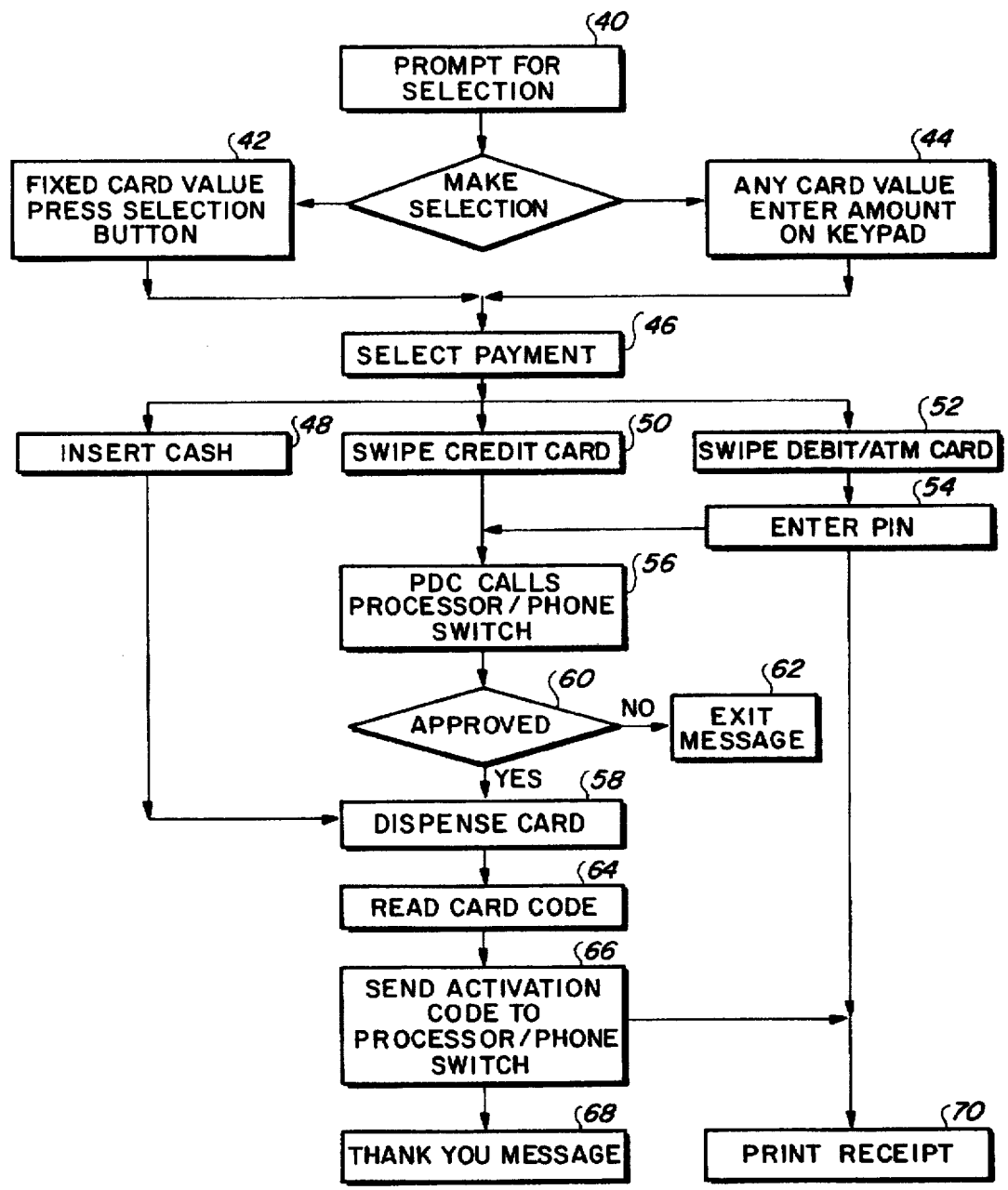
FIG. 5 is a functional flow chart for a dispenser employing preprinted phone card.
Figure 6:
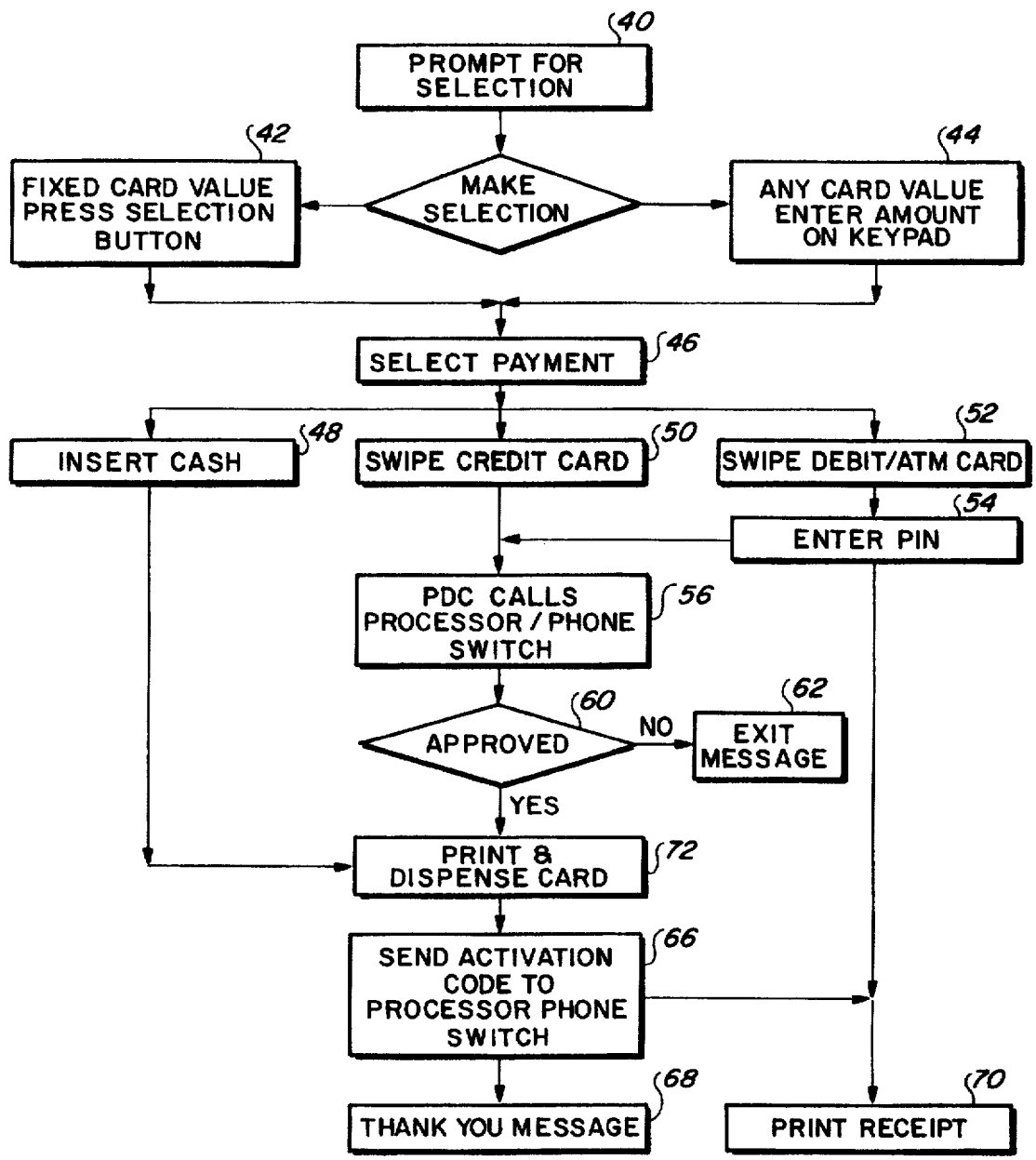
FIG. 6 is a functional flow chart illustrating an alternate embodiment of a phone card dispenser issuing dispenser printed cards.

Such functions are illustrated with reference to FIGS. 5 and 6. The customer is prompted for a selection, which in the present invention, will be for the fixed card value option 42 or any card value option 44 entered by way of the key pad 20 as earlier described. The dispenser 10, as will be further described later with reference to FIG. 7, then selects payment 46 for either inserting cash 48, "swiping" a credit card 50, or swiping a debit or ATM style card 52. Should a debit card be used, the customer will be prompted to enter a PIN number 54 as earlier described and as illustrated in the functional flow of FIG. 6. The phone card dispenser 10 then generates, through its microprocessor 74, a real-time communication 56 with a clearing facility or processor and the appropriate phone switch or selected telecommunications carrier, using a modem 82 as illustrated with reference to FIG. 7.

The processor function is generally filled by an electronic clearing house or a bank. The dispenser 10 will call the processor after it reads a credit card to verify that the credit card is valid. In addition, it will verify the availability of funds and in the case of an ATM card will check for a valid PIN number. In the case of a clearing house, the electronic transfer or conversion via the telephone line or radio modem 82 is routed to the card issuer (e.g., a local or long distance carrier), who will then respond to the phone card dispenser 10 through the clearing house. The clearing house is primarily the router of calls. If a bank is the processor, it fulfills the same router function as the clearing house. However, if the card in question is issued by the bank, it can proceed directly without any further instructions. This happens more in ATM card uses which are primarily regional.

Upon successful verification, the processor will debit the cardholder's (customer's) account and transfer funds to the dispenser operator's account.

The switch for a telephone communications carrier is usually owned and operated by the phone company or long distance carrier selected for issuing the prepaid phone cards. The switch provides call accounting features which, by way of example, account for customers placing calls, to whom the call has been placed and how much is charged for the call. The dispenser 10, through its microprocessor 74 and modem 82, calls the telecommunications carrier and updates it database with the value and serial number of the phone card being dispensed. This process takes place within seconds after the sale and dispensing of the card 12 to the customer. In this way, a customer can use a newly purchased telephone card 12 immediately.

In use of one embodiment of the present invention, a customer will use the card 12 or an issued receipt 71 by dialing an access number, then a card PIN number, and then the number he wishes to reach. A phone card PIN number will be provided with the printed card. The instructions as to how to proceed with a telephone call will also be printed on a face of the phone card 12. The method and sequence of numbers will vary slightly between telephone companies, but the function will be the same. Each card 12 or receipt 71 has a unique serial number, which, as for the card 12 is illustrated with reference to FIG. 2, is in the form of the bar code 30. The dispenser 10 reads the bar code 30, using a barcode sensor 84, while the card 12 is being issued to the customer. The number represented by the bar code 30 is the serial number that the telecommunications carrier or switch will use to identify the card 12.

Again with reference to FIG. 5, in the case of a preprinted card 12, the dispenser 10 will dispense the card 58 through its dispense module 11 in response to a cash payment 48 or an approved credit payment 60. If credit verification is not received, the customer will be prompted via the display 32 with an exit message 62, typically asking that he retry his selection 40. In the preferred embodiment of the present invention, the bar code 30 is read 64 from preprinted cards as it is dispensed to the customer. The barcode will also be read by the selected carrier when using the phone card 12. In addition, the activation code including the card value is transmitted to the clearing house and the selected telecommunications carrier 66. Optionally, a thank you message 68 is displayed on display 32 for the customer and a printed receipt 70 provided for the customer's use through the printer output port 34 of printer 35 illustrated with reference to FIGS. 3a and 7.

Again with reference to FIG. 5, with preprinted cards requiring application of arbitrary phone card values selected by the customer, the phone card 12 will be dispensed as earlier described, but phone card value information will be printed on the card or as is done in the preferred embodiment of the present invention included in the printed receipt 70 (shown as receipt 71 in FIG. 3a by way of example) identifying information including customer verification, PIN number and general use instructions. In embodiments of the present invention where dispenser blank cards are used, and after approval 60 or cash receipt 48, a card 12 is printed and dispensed 72. The activation code is delivered to the processor and telecommunications carrier 66 as earlier described in the card 12 dispensed to the customer. The need to read the preprinted card information contained in the bar code 30 is not necessary for dispenser printed card distribution.

To further describe the operation of dispenser, in cases where telephone cards have no identifying marks or have unreadable codes, the dispenser 10 will assign and print a code number for the customer. This code number will then be transmitted to the telecommunications carrier instead of the card identifying code. The customer will be able to use the dispensed telephone card with this printed code. Alternatively, instead of the dispenser 10 assigning a code for an unmarked, unreadable card, it can be set up to call the selected telecommunications carrier and request a code number which will then be printed on the receipt 71 for the customer's use.

If the dispenser 10 is set up to be used with telecommunication carriers that do not accept machine-generated codes or cannot issue codes upon request by the dispenser 10 in real time, the receipt message is altered to instruct the customer to call a toll free help number to activate the card in the same manner as earlier described. If the dispenser 10 is unable to contact the telecommunications carrier at the time of sale, it will print out a receipt with a different control code which will instruct the customer to call a toll free number and activate the phone card by giving the control code. By way of example, this control code is an encrypted machine identification number which includes the activation date (sale date) and the value of the phone card.

The dispenser 10, in an alternate embodiment, is set up to issue access codes through the receipt printer port 34 or display 32 rather than the phone card 12. The function is as earlier described, except that instead of dispensing the phone card 12, the receipt printed 71 will have the access code number and any relevant instructions for the customer. If cash is used for payment, the dispenser 10 will communicate such information to the telecommunications carrier prior to the printing of the code. Credit, debit or ATM type transactions will proceed as earlier described.

In addition, the dispenser 10, through its microprocessor 74, optionally sends reports nightly through E-mail or directly to a host identifying an activity summary including the number and values of cards sold, the amount of cash in the dispenser, and current levels of card inventory when applicable.

Optionally, if no phone card activation is desired, the dispenser is programmed to negate the activation and telephone switch call routine. In this case, the dispenser will function as a dispenser of already preactivated cards.

As herein described, the functions of the dispenser 10 include the capability of calling a processor for credit, debit or ATM card validation as well as the telecommunications carrier or telephone switch for phone card activation for the issuance of access code numbers and an E-mail system to handle its inventory and maintenance requirements. It is not limited to such functions and depending on the capability of the processor's computer, these functions can be accomplished during the first call to the processor, for example, the call for validation, making any further calls unnecessary. In this case the processor's computer would redirect the information destined for the switch, for example, the phone card serial number, activation date, and value through its link up with the telecommunications carrier. The dispenser 10 will also send a brief status report during the validation communication which would be redirected to the host computer to update its database. Such a function and method permits considerable reduction in phone traffic and access time, and the response time to the customer is greatly improved due to the elimination of the weight for the second dial up.

To accomplish such functions as herein described, and as illustrated with reference to FIG. 7, the phone card dispenser 10 in a preferred embodiment of the present invention comprises a microprocessor 74 having a read only memory, ROM 76, and a battery-backed random access memory, RAM 78. The operating software (not included) resides in the ROM 76 and the variable data, for example transactions, names and values are kept in the RAM 78. The microprocessor 74 interfaces directly with an encrypted PIN pad or input key pad 20 and a magnetic strip card reader or credit card reader 16 as earlier described. The key pad 20 serves as an entry facility for secret PIN codes, such as required for use with ATM cards. Further, the key pad 20 communicates directly with the processor or clearing house for key codes and data entry in order to maintain security. The card reader 16 serves to read the customer's card number, expiration date, routing codes, and names for the validation in electronic debit facility whether it be the clearing house or bank with whom on line communication is made.

Inputs and outputs to the primary and optional peripheral devices are handled via an interface and control board 80. A selection button matrix with LED indicators, described earlier as the value and carrier selection buttons 18, presents the customer with various choices for telephone card type and value and upon selection, instructs the interface and control board 80 based on the customer's selection, described earlier in the functional flow chart of FIGS. 5 and 6. In the preferred embodiment of the present invention, on line communications with the clearing house and telecommunications carrier is performed via the modem 82 interfacing with the microprocessor 74 through the interface and control board 80. The bill receiver 14, and receipt printer 35 having printer output port 34 earlier described, interface with the microprocessor 74 through the interface and control board 80 as well.

The control and connections to a single dispenser module 11 or multiple dispenser modules 11, 11a, as illustrated with reference to FIG. 7, are performed by the interface and control board 80 through a marshalling and distribution board 86. Each card dispenser module 11 or 11a has an associated bar code sensor 84, 84a, and paper and card storage 85, 85a also interfacing with the interfacing control board 80 through the marshalling and distribution board 86. As illustrated with reference to FIG. 7 and as earlier described, it is anticipated that multiple dispenser modules 11 and barcode sensors 84 are located within a single dispenser apparatus 10.

While specific embodiments of the invention have been described in detail herein above, it is to be understood that various modifications may be made from the specific details described herein without departing from the spirit and scope of the invention as set forth in the appended claims. Having now described the invention, the operation and use of preferred embodiments thereof, and the advantageous new and useful results obtained thereby, the new and useful methods of use and reasonable equivalents thereof obvious to those skilled in the art are set forth in the appended claims.

What is claimed is:

1. An apparatus for dispensing a card for use in debit purchasing from a vendor, the apparatus comprising:
   means for storing a plurality of cards;
   means for selecting a value for providing a selected card with the value for use with a vendor, the selecting means responsive to a customer demand;
   means for associating a customer demand with a payment, the payment having at least the value sufficient for dispensing the selected card;
   means for providing an activation code acceptable to the vendor,
   means for reporting the activation code to the selected vendor for permitting card use; and
   means for dispensing the selected card to the customer.

2. The apparatus as recited in claim 1 further comprising means for selecting a vendor from a set of vendors accepting debit purchasing.

3. The apparatus as recited in claim 1, further comprising means for imprinting a card having the selected value and the activation code.

4. The apparatus as recited in claim 3, wherein the imprinting means comprises a printer for providing indicia representative of the value and the code.

5. The apparatus as recited in claim 1, wherein the storing means further comprises means for storing the cards from the group consisting of discrete stacked cards and a continuously roll of separable cards, each group having the cards positioned for electro-mechanical dispensing of each card.

6. The apparatus as recited in claim 1, wherein the customer demand associating means comprises means for associating the customer demand with a lender identification number provided by the customer, means for obtaining customer credit approval from a lender associated with the lender number, and means for reporting the dispensed card value to the associated lender.

7. The apparatus as recited in claim 1, wherein the card providing means further comprises means for printing the activation code on a surface of the card.

8. An apparatus for dispensing a receipt for use in prepaid purchasing of product from a vendor, the apparatus comprising:
   means for storing a plurality of receipts, each receipt dimensioned for receiving indicia indicating a distinguishable value and an activation code acceptable to a vendor;
   means for selecting a prepaid amount for purchasing product from a vendor;
   means for associating a customer demand with a payment, the payment having at least the value of the prepaid amount;
   means for imprinting the prepaid amount and an activation code on the receipt;
   means for reporting the activation code and the amount to the vendor for permitting prepaid purchasing of product by the customer; and
   means for dispensing the receipt to the customer.

9. The apparatus as recited in claim 8, wherein the receipts comprise cards stackably stored for printing by the imprinting means prior to the dispensing to the customer.

10. The apparatus as recited in claim 8, wherein the customer demand associating means further comprises the means for associating the customer demand with a payment made from one of a cash payment, a credit card payment, and a bank debit card payment.

11. The apparatus as recited in claim 8, wherein the customer demand associating means comprises means for associating the customer demand with an identification number provided by the customer, means for obtaining customer credit approval from an associated lender for the identification number, and means for reporting the dispensed receipt value to the associated lender.

12. An apparatus for dispensing a pre-paid telephone card for use in debit purchasing from a selected telecommunications vendor, the apparatus comprising:
   means for storing a plurality of telephone cards,
   means for selecting a value for providing the telephone card having the value, the selection means responsive to a customer demand;
   means for selecting a telecommunications carrier, the carrier having a distinguishable activation code for access to the carrier when placing prepaid telephone calls;
   means for associating a customer demand with a payment, the payment having the value sufficient for dispensing the selected card;
   means for reporting the activation code to the selected carrier for permitting telephone card use by the customer; and
   means for dispensing the card to the customer.

13. The apparatus as recited in claim 12, further comprising means for printing the activation code on the card.

14. The apparatus as recited in claim 12, wherein the plurality of cards comprises distinguishable sets of preprinted cards, each set having cards of a fixed value and carrier selection by the customer.

15. The apparatus as recited in claim 12, further comprising:
   means for storing a plurality of blank receipts, each receipt dimensioned for receiving indicia providing the value and the selected vendor activation code; and
   means for imprinting the value and the activation code on a surface of the receipt.

16. An apparatus for providing a prepaid telephone card for use with a selected telecommunications carrier, the apparatus comprising:
   means for selecting a value and a telecommunications carrier for providing an activation code acceptable to a selected telecommunications carrier, each code permitting debit purchasing from the selected carrier, the selecting means responsive to a customer demand;
   data processing means for associating the customer demand with an electronic funds transfer payment having the selected value;
   means for receiving customer identification sufficient for obtaining customer credit approval from a clearing facility, the receiving means providing input to the data processing means;
   telecommunication means for communicating with the selected carrier and the clearing facility for initiating electronic funds transfer for each phone card transaction, the telecommunication means generating a real-time communication with the clearing house for determining customer credit validity and for the initiating of electronic funds collection, the telecommunications means further generating real-time communication with the telecommunications carrier for initiating the funds transfer to the carrier;
   means for providing the card having the value, the card further having an activation code recognizable by the carrier; and means for dispensing the card to the customer.

17. The apparatus as recited in claim 16, further comprising means for rejecting the customer demand in response to a clearing house notice of insufficient customer credit, the rejecting means prompting the customer.

18. The apparatus as recited in claim 16, further comprising means for generating an activities report containing information regarding customer use of the apparatus.

19. The apparatus as recited in claim 16, wherein the card providing means comprises means for printing indicia on a surface of the card, the indicia including the selected value and the selected carrier activation code.

20. The apparatus as recited in claim 16, further comprising means for printing a receipt having indicia representative of the code and value, the printing means controlled by the data processing means.

21. An apparatus for dispensing a card for use in debit purchasing from a vendor, the apparatus comprising:
   means for storing a plurality of cards useful in credit purchasing with a vendor;
   means for selecting a value for providing a selected card with the value for use with the vendor, the selecting means responsive to a customer demand;
   means for associating a customer demand with a payment, the payment having at least the value sufficient for dispensing the selected card;
   means for providing an activation code acceptable to the vendor;
   means for reporting the activation code to the selected vendor for permitting card use; and
   means for dispensing the selected card to the customer.

22. The apparatus as recited in claim 21, further comprising means for imprinting the activation code on the selected card.

23. The apparatus as recited in claim 21, further comprising:
   means for storing a plurality of blank receipts, each receipt dimensioned for receiving indicia having a distinguishable value, and an activation code acceptable to a vendor; and
   means for dispensing the receipt to the customer.

24. The apparatus as recited in claim 23, further comprising means for imprinting indicia on the receipt indicative of the payment.

25. An apparatus for dispensing a card for use in debit purchasing from a vendor, the apparatus comprising:
   means for storing a card having a value and an activation code useful in credit purchasing with a vendor;
   means for selecting the card, the selecting means responsive to a customer demand;
   means for associating the demand with a payment having at least the value;
   means for reporting the activation code to the vendor for permitting card use; and
   means for dispersing the card to the customer.

26. An apparatus for dispensing a card for use in debit purchasing from a vendor, the apparatus comprising:
   means for storing a card having an activation code useful in credit purchasing with a vendor;
   means for receiving a payment heaving a value acceptable to the vendor;
   means for providing the card with the value in response to the payment;
   means for reporting the value and code to the vendor; and
   means for dispensing the card having the value and code.

27. The apparatus as recited in claim 26, further comprising means for imprinting the card with the value.

* * * * *